Dec. 15, 1970      PIERRE-HENRI GALLAY      3,548,044
METHOD FOR BLOW EXTRUSION
Filed Aug. 2, 1967

Inventor
Pierre-Henri Gallay
By
Cushman, Darby & Cushman
Attorneys

United States Patent Office 3,548,044
Patented Dec. 15, 1970

3,548,044
METHOD FOR BLOW EXTRUSION
Pierre-Henri Gallay, Neuilly-sur-Seine, France, assignor to Mecaplast S.A., Geneva, Switzerland, a Swiss body corporate
Filed Aug. 2, 1967, Ser. No. 657,923
Claims priority, application France, Aug. 4, 1966, 72,156
Int. Cl. B29c 17/07, 24/00
U.S. Cl. 264—89          1 Claim

ABSTRACT OF THE DISCLOSURE

The invention relates to a method for blow-extruding a hollow article from a thermo-plastic material in which a parison is extruded into a mold. Light pressure is applied to said parison to expand a portion thereof between the extruder and mold and this portion is gripped to form a flange, which serves to locate the parison on the mold. The parison is then blown to form the body.

---

In the blow-extrusion of a hollow body of thermoplastic material, the tubular parison which is obtained at the outlet from the die is in many cases delivered vertically downwards, to use gravity to assist in delivery. Now, if it is desired to form a hollow body having its opening facing upwardly, which is for example particularly advantageous when it is desired to form the bottom of a bottle in the least drawn out part of the parison or to carry out the direct filling of a flask during the operating cycle concerned with the moulding, it is necessary to locate the top of the parison at the upper part of the mould in order to avoid sagging of the said parison and the deformations which originate therefrom. The defects observed are shown in irregularities in the blowing, folds, and local doubling of the thickness and displacement of the material by the blowing nozzle, thus resulting in defective elements in a relatively high proportion resulting in losses.

A number of solutuions have already been proposed, such as the extrusion of the parison with a diameter larger than that which is desired, this involving a nipping of the excess material in the planes of the joints of the different parts of the moulds, these jointing planes being then specifically designed so as to effect the cutting of the excess of material thus eliminated. Suction arrangements have also been proposed, which ensure the positioning of the neck by a suction zone, closed by a grid or a porous device situated at the top of the mould.

According to one aspect of the invention there is provided a method of forming a neck on a hollow body prior to blow moulding, from a thermoplastic material, in which a tubular parison is extruded downwardly and introduced into a mould where it is subjected to blowing, in which, before detaching the parison from the extruder the parison is subjected to a light blowing, such as to expand that portion between the extruder and the upper part of the mould, and the said portion is gripped around at least a part of its periphery to form a flange to retain the parison on the mould. The invention also provides apparatus for carrying out the method such apparatus comprising an extruder having an extrusion head with an extrusion orifice spaced above a mould, and gripping means located between the extrusion orifice and the upper part of the mould, such gripping means having a central space corresponding to the upper orifice of the mould, and such gripping means being moveable axially downwardly.

With the method of the invention perfect locating of the top of the parison may be achieved and hollow bodies may be obtained which have a regular non-welded neck of which the diameter can vary within large proportions without any difficulty and without risk of the material sagging or collapsing, with a high rate of manufacture and without accidental deformation, particularly during the positioning of the blow nozzle.

In order that the invention may more readily be understood, the following description is given, merely by way of example, reference being made to the accompanying drawings, in which.

Figure 1:
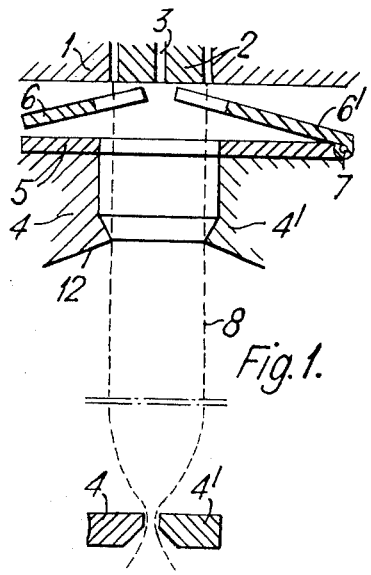
FIGS. 1 to 3 are axial sections through one embodiment of apparatus according to the invention, at three different stages of the method.
Figure 2:
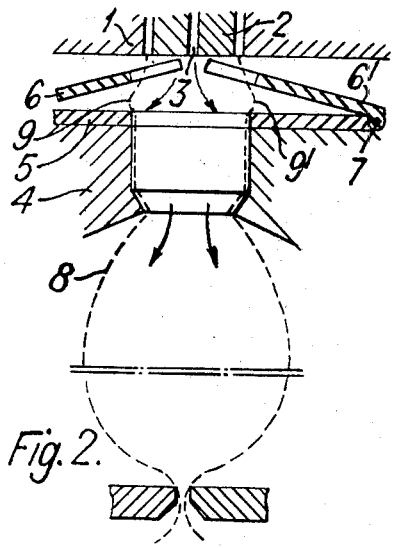
Figure 3:
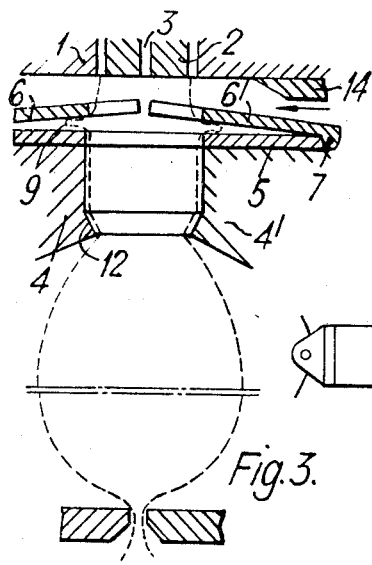

In the embodiment shown in FIGS. 1 to 3, an extrusion die having a plunger and an air supply orifice 3 is placed vertically above a mould 4, 4', of which only the upper part in the zone of the neck and the lower part in the nipping zone for the parison are shown.

Arranged between the upper part of the mould and the die 1 is a nipping arrangement, which comprises a fixed plate 5 and two movable plates 6, 6', which are arranged to pivot about hingles 7 on the plate 5. These parts 6, 6' are recessed in their central portion so as to form a free orifice around the passage of the parison 8 with a fairly large clearance, which is for example between 0.2 and 1 mm.

As will be seen form FIG. 2, a gentle blowing through the orifice 3 swells the parison 8 and causes the formation of expanded portions 9, 9'. The nipping devices 6, 6' (FIG. 3) then pivot about the hinges 7, and in turning, squeeze the portions 9, 9', thereby forming a flange.

At this stage, the parison can be detached from the nozzle, for example by the cutter 14, and the mould can be retracted so as to permit firstly a new extrusion cycle and secondly the blowing of the hollow body at another working station.

It is found that the opening of the parison is freed and permits the positioning of the blowing nozzle without danger of deformation, that the parison is stabilised without any danger of sagging, this resulting firstly from the pre-blowing and the partial swelling of the parison which results therefrom and secondly from the retention by nipping of the flange 9, 9'.

Figure 4:
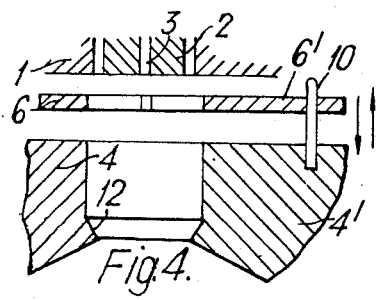
FIG. 4 is an axial section showing another embodiment of the apparatus.

In the embodiment shown in FIG. 4, the positioning arangement comprises a plate or two half-plates 6, 6', which are adapted to slide parallel to the axis of the nozzle, while being guided by the vertical shafts 10.

Figure 5:
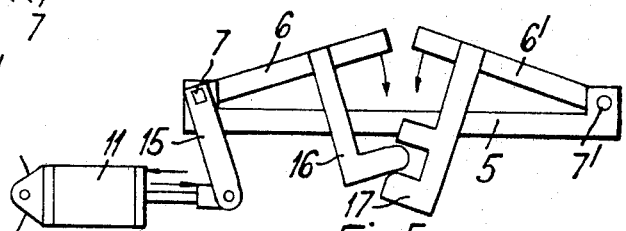
FIG. 5 is a diagrammatic view of the control mechanism of the nipping device.

FIG. 5 shows a method of mounting the plates 6, 6', which respectively carry engaging elements 16, 17 and which are driven by a jack 11 by means of the rod 10.

Figure 6:
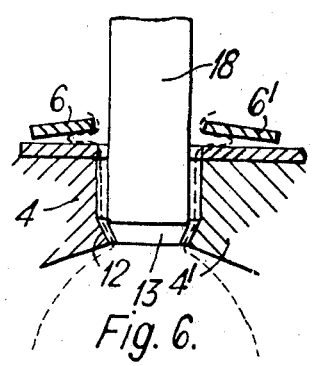
FIG. 6 is a view of the arrangement according to the invention at the moment of carrying out the blowing operation.

As will be seen in FIG. 6, when the mould comprises a conical shoulder 12, the rigid fixing of the parison by the flange 9 permits the shaping of the parison by blowing, under improved conditions, the blowing nozzle 13 bearing on the shoulder 12.

If desired the fixed part of the nipping arrangement may be a part of the mould itself; it is also possible for the control means of this arrangement to be of a pneumatic, mechanical, electrical or magnetic type.

I claim:

1. A method of blow extruding a hollow body from thermoplastics material, comprising the steps of:
   (a) providing a blowing extruder, having an extrusion head spaced above a mold having openable mold halves with an upper orifice;

(b) extruding a tubular parison downwardly between the open mold halves;

(c) closing the mold halves to grip said parison at least at the bottom of said mold;

(d) subsequently blowing lightly into the parison from the top thereof through said extrusion head, effective to cause the portion of the parison between the mold and extruder to expand laterally;

(e) gripping at least a portion of the periphery of the said expanded portion in grippers and mechanically moving said grippers axially downwardly effective to form a flange for locating the parison in said mold;

(f) detaching the parison from the extruder; and (g) subsequently blowing said parison in said mold to form said hollow body.

References Cited

UNITED STATES PATENTS 3,224,038   12/1965   Budesheim _____ 264—98X
3,375,551   4/1968    Sherlock _____ 264—296X ROBERT F. WHITE, Primary Examiner J. H. SILBAUGH, Assistant Examiner U.S. Cl. X.R.

18—5; 264—98, 296